(12) United States Patent
Xiang et al.

(10) Patent No.: US 12,124,676 B2
(45) Date of Patent: Oct. 22, 2024

(54) ICON DISPLAYING METHOD AND ELECTRONIC DEVICE

(71) Applicant: VIVO MOBILE COMMUNICATION CO., LTD., Dongguan (CN)

(72) Inventors: Yonghang Xiang, Dongguan (CN); Jiawen Geng, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/869,770

(22) Filed: Jul. 20, 2022

(65) Prior Publication Data

US 2022/0357837 A1    Nov. 10, 2022

Related U.S. Application Data (63) Continuation of application No. PCT/CN2021/071733, filed on Jan. 14, 2021.

(30) Foreign Application Priority Data

Jan. 21, 2020    (CN) .......................... 202010070517.3

(51) Int. Cl.
*G06F 3/0481*  (2022.01)
*G06F 1/16*    (2006.01)
(Continued)

(52) U.S. Cl.
CPC ........ *G06F 3/04817* (2013.01); *G06F 1/1607* (2013.01); *G06F 3/03545* (2013.01); *G06F 3/046* (2013.01); *G06F 3/0481* (2013.01); *G06T 11/60* (2013.01); *G06F 2200/1632* (2013.01); *G06T 2200/24* (2013.01)

(58) Field of Classification Search
None
See application file for complete search history.

(56) References Cited

U.S. PATENT DOCUMENTS 10,649,713 B1 *   5/2020   Liu ........................ G09G 5/02
2006/0227118 A1   10/2006  Uen
(Continued)

FOREIGN PATENT DOCUMENTS

| CN | 201654753 A | 11/2010 |
|---|---|---|
| CN | 101901038 A | 12/2010 |

(Continued)

OTHER PUBLICATIONS

Partial supplementary European search report issued in related European Application No. 21744649.1, mailed Jan. 5, 2023, 13 pages.

(Continued)

*Primary Examiner* — Xuyang Xia
(74) *Attorney, Agent, or Firm* — IPX PLLC (57) ABSTRACT

An icon displaying method and an electronic device are provided. The method is performed by the electronic device. The electronic device includes a device body and a stylus detachably connected to the device body. The method includes: obtaining a first working state of the stylus, where the first working state includes at least one of remaining (Continued)

power, a font color, or a font size of the stylus; and displaying an icon corresponding to the stylus based on the first working state.

15 Claims, 3 Drawing Sheets (51) Int. Cl.
*G06F 3/0354* (2013.01)
*G06F 3/046* (2006.01)
*G06F 3/04817* (2022.01)
*G06T 11/60* (2006.01)

(56) References Cited

U.S. PATENT DOCUMENTS

| | | | | |
|---|---|---|---|---|
| 2009/0277694 | A1* | 11/2009 | Hansen | G06F 3/0421 178/18.03 |
| 2011/0285671 | A1* | 11/2011 | Wu | G06F 3/0362 345/179 |
| 2012/0304111 | A1* | 11/2012 | Queru | G06F 3/0482 715/781 |
| 2014/0180481 | A1 | 6/2014 | Park et al. | |
| 2014/0218338 | A1* | 8/2014 | Kim | G06F 3/03545 345/174 |
| 2014/0253468 | A1 | 9/2014 | Havilio et al. | |
| 2014/0253469 | A1* | 9/2014 | Hicks | G06F 3/03545 345/173 |
| 2016/0364091 | A1* | 12/2016 | Bernstein | G06F 3/0488 |
| 2017/0235384 | A1 | 8/2017 | Fleck et al. | |
| 2018/0203527 | A1* | 7/2018 | Matsui | G06F 3/038 |
| 2020/0050242 | A1* | 2/2020 | Seo | G06F 1/1626 |

FOREIGN PATENT DOCUMENTS

| | | | |
|---|---|---|---|
| CN | 103235271 | A | 8/2013 |
| CN | 101539816 | A | 9/2019 |
| CN | 305385299 | S | 10/2019 |
| CN | 111273992 | A | 6/2020 |
| KR | 20180050253 | A * | 5/2018 ......... G06F 3/03545 |
| TW | M582619 | U | 8/2019 |

OTHER PUBLICATIONS

Master Lu, "Do you know how to use the Huawei M-Pencil stylus?", sina, Dec. 12, 2019, pp. 1-6, XP55977954A.
Extended European search report issued in related European Application No. 21744649.1, mailed Apr. 4, 2023, 14 pages.
First Office Action issued in related Chinese Application No. 202010070517.3, mailed Feb. 3, 2023, 11 pages.
International Search Report issued in corresponding International Application No. PCT/CN2021/071733, mailed Apr. 15, 2021, 5 pages.

* cited by examiner

ICON DISPLAYING METHOD AND ELECTRONIC DEVICE

CROSS-REFERENCE TO RELATED APPLICATIONS

This application is a continuation of International Application No. PCT/CN2021/071733, filed Jan. 14, 2021, which claims priority to Chinese Patent Application No. 202010070517.3, filed Jan. 21, 2020. The entire contents of each of the above-referenced applications are expressly incorporated herein by reference.

TECHNICAL FIELD

Embodiments of the present disclosure relate to the field of communications technologies, and in particular, to an icon displaying method and an electronic device.

BACKGROUND

With the rapid development and popularization of mobile electronic devices such as smartphones, e-readers, and tablet computers, more electronic devices use touch panels as operation interfaces for users to perform touch operations, thereby improving convenience. To operate the touch panels faster and more precisely, most of the users use styluses for touch inputs, and functions of the styluses are increasingly enriched.

With the continuous enrichment of the functions of the styluses, how to enable a user to learn a state of a stylus in real time has become an urgent problem.

SUMMARY

Embodiments of the present disclosure provide an icon displaying method and an electronic device.

According to a first aspect, an embodiment of the present disclosure provides an icon displaying method performed by an electronic device. The electronic device includes a device body and a stylus detachably connected to the device body, and a battery is disposed in the stylus. The method includes:

obtaining a first working state of the stylus, where the first working state includes at least one of remaining power, a font color, or a font size of the stylus; and displaying an icon corresponding to the stylus based on the first working state.

According to a second aspect, an embodiment of the present disclosure further provides an electronic device. The electronic device includes a device body and a stylus detachably connected to the device body; a battery is disposed in the stylus; and the electronic device further includes:

an obtaining module, configured to obtain a first working state of the stylus, where the first working state includes at least one of remaining power, a font color, or a font size of the stylus; and a first processing module, configured to display an icon corresponding to the stylus based on the first working state.

According to a third aspect, an embodiment of the present disclosure further provides an electronic device, including a processor, a memory, and a computer program stored in the memory and executable by the processor, where when the computer program is executed by the processor, the steps of the foregoing icon displaying method are implemented.

According to a fourth aspect, an embodiment of the present disclosure further provides a computer-readable storage medium, storing a computer program, where when the computer program is executed by a processor, the steps of the foregoing icon displaying method are implemented.

In the foregoing solutions of the embodiments of the present disclosure, a first working state of a stylus detachably connected to a device body of an electronic device is obtained; a battery is disposed in the stylus; the first working state includes at least one of remaining power, a font color, or a font size of the stylus; and an icon corresponding to the stylus is displayed based on the first working state. Therefore, the icon that corresponds to the stylus and that can reflect a working state of the stylus is displayed on the electronic device, which can enable a user to learn a state of the stylus in real time and improve user's experience of using the stylus.

DETAILED DESCRIPTION

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 1:
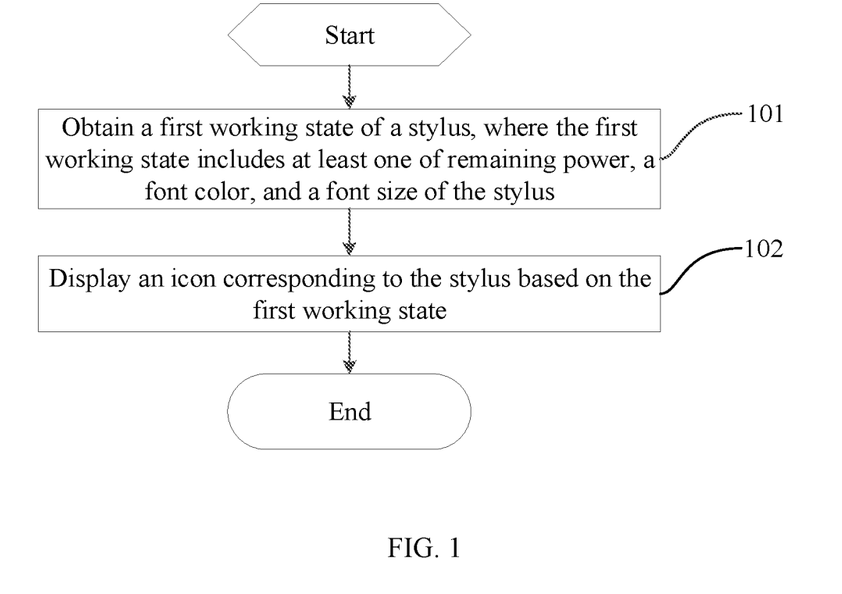
FIG. 1 is a flowchart of an icon displaying method according to an embodiment of the present disclosure.

FIG. 1 is a flowchart of an icon displaying method according to an embodiment of the present disclosure. The method is performed by an electronic device. The electronic device includes a device body and a stylus detachably connected to the device body; and a battery is disposed in the stylus. The method may include:

Step 101: Obtain a first working state of the stylus, where the first working state includes at least one of remaining power, a font color, or a font size of the stylus.

In this step, the font color of the stylus is a color displayed on a touch display screen of the electronic device when a user performs a touch operation on the touch display screen by using the stylus; and the font size of the stylus is thickness of a line displayed on the touch display screen of the electronic device when the user performs the touch operation on the touch display screen by using the stylus.

Step 102: Display an icon corresponding to the stylus based on the first working state.

In some embodiments, the icon corresponding to the stylus is displayed in a state bar, a notification bar, or a lock screen of the touch display screen. It should be noted that, the icon corresponding to the stylus may be displayed in another place where a state of the stylus needs to be displayed. This is not specifically limited herein.

In some embodiments, in a case that the stylus has a display screen, the icon corresponding to the stylus is displayed on the display screen.

It should be noted that, the icon corresponding to the stylus is used to reflect a current state of the stylus. In other words, the user can learn the current state of the stylus by viewing the icon corresponding to the stylus.

According to the icon displaying method in this embodiment of the present disclosure, a first working state of a stylus detachably connected to a device body of an electronic device is obtained; a battery is disposed in the stylus; the first working state includes at least one of remaining power, a font color, or a font size of the stylus; and an icon corresponding to the stylus is displayed based on the first working state. Therefore, the icon that corresponds to the stylus and that can reflect a working state of the stylus is displayed on the electronic device, which can enable a user to learn a state of the stylus in real time and improve user's experience of using the stylus.

Figure 2:
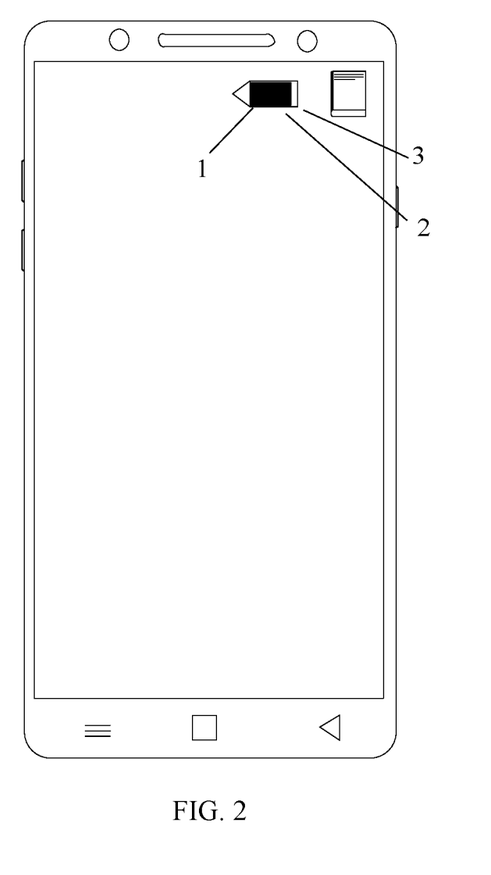
FIG. 2 is a schematic diagram of an icon corresponding to a stylus according to an embodiment of the present disclosure.

In some embodiments, as shown in FIG. 2, the icon corresponding to the stylus includes a tip displaying portion 1 and a body displaying portion 2 connected to the tip displaying portion 1, where a first displaying parameter of the tip displaying portion 1 and/or a second displaying parameter of the body displaying portion 2 are/is used to represent the first working state.

In some embodiments, as shown in FIG. 2, the icon corresponding to the stylus is pen-shaped; the tip displaying portion 1 is triangular; and the body displaying portion 2 is rectangular.

Herein, the first displaying parameter of the tip displaying portion 1 includes a size of the tip displaying portion 1; and the second displaying parameter of the body displaying portion 2 includes a length, a color, and a width of the body displaying portion 2.

As shown in FIG. 2, when the body displaying portion 2 includes a power prompt part 3, the second displaying parameter of the body displaying portion 2 may further include an area and a color of the power prompt part 3.

In some embodiments, the remaining power of the stylus is represented by the length of the body displaying portion; the font color of the stylus is represented by the color of the body displaying portion; and the font size of the stylus is represented by the width of the body displaying portion or the size of the tip displaying portion.

In some embodiments, as shown in FIG. 2, when the body displaying portion 2 includes the power prompt part 3, the remaining power of the stylus is represented by the area of the power prompt part 3; the font color of the stylus is represented by the color of the power prompt part 3; and the font size of the stylus is represented by the width of the body displaying portion or the size of the tip displaying portion.

It should be noted that, when the body displaying portion 2 includes the power prompt part 3, the area of the power prompt part 3 is less than or equal to an area of the body displaying portion 2.

Herein, when the area of the power prompt part 3 is equal to the area of the body displaying portion 2, the power of the stylus is not consumed, and the stylus is in a fully charged state.

When the area of the power prompt part 3 is less than the area of the body displaying portion 2, the power of the stylus is consumed; and the area of the power prompt part 3 is used to represent the remaining power of the stylus. A smaller area of the power prompt part 3 indicates a smaller amount of remaining power of the stylus.

Based on the embodiment shown in FIG. 1, in an optional implementation, step 101 of the method in the present disclosure may further include:

obtaining the first working state of the stylus when it is monitored that the stylus is separated from the device body.

In this step, when it is monitored that the stylus is separated from the device body, that is, when the stylus is not disposed in the device body, the first working state of the stylus is obtained; and then, the icon corresponding to the stylus is displayed based on the first working state. In this way, the user can be instructed that the stylus is separated from the device body; and when the stylus is not in use, the user can be prompted to put the stylus into the device body, thereby avoiding loss of the stylus.

Based on the embodiment shown in FIG. 1, in an optional implementation, after step 102, the method in the present disclosure may further include:

canceling display of the icon corresponding to the stylus when it is monitored that the stylus is detachably connected to the device body.

In this step, when it is monitored that the stylus is detachably connected to the device body, the stylus is disposed in the device body. In this case, canceling the display of the icon corresponding to the stylus can make the content displayed on the touch display screen of the electronic device more concise, thereby saving display space and providing more display space for another icon or notification.

In some embodiments, the icon corresponding to the stylus further includes: a pen cap displaying portion. Accordingly, after step 102, the method of the present disclosure may further include the following steps:

Display the pen cap displaying portion at a position away from the tip displaying portion by a preset distance or cancel display of the pen cap displaying portion when it is monitored that the stylus is separated from the device body.

It should be noted that, the followings are objectives of the displaying the pen cap displaying portion at a position away from the tip displaying portion by a preset distance or canceling display of the pen cap displaying portion when it is monitored that the stylus is separated from the device body, that is, when the stylus is not disposed in the device body: The user can be instructed that the stylus is currently separated from the device body; and when the stylus is not in use, the user can be prompted to put the stylus into the device body, thereby avoiding loss of the stylus.

Herein, the tip displaying portion is covered with the pen cap displaying portion when it is monitored that the stylus is detachably connected to the device body. In this way, the user can be instructed that the stylus is disposed in the device body.

Based on the foregoing limitation to specific components of the icon corresponding to the stylus, to meet user's personalized demand for a state of the stylus and enable the user to adjust the state of the stylus conveniently, in an optional implementation, the first working state includes at least one of the font color or the font size of the stylus, and the method of the present disclosure may further include the following steps:

Receive a first input for a target displaying portion of the icon corresponding to the stylus.

In this step, the first input is a preset input. In some embodiments, the first input may include but is not limited to at least one of a click input, a press input, a long-press input, a pinch input, a drag input, a slide input, or a swipe input. In other words, the first input may be one of the foregoing inputs, or a combination of two or more of the foregoing inputs.

Display a target selection interface in response to the first input.

Switch the stylus from the first working state to a second working state according to a selection operation of the user on the target selection interface, and update the icon corresponding to the stylus according to the second working state.

Herein, inputs for different displaying portions of the icon corresponding to the stylus are intended to adjust the stylus to different working states, respectively; and the second working state of the stylus after the adjustment may be represented by updating the icon corresponding to the stylus.

Herein, in a case that the user wants to adjust the font color of the stylus, that is, the first working state includes the font color of the stylus, the target displaying portion is the body displaying portion, and the adjustment includes the following steps:

Receive a first preset input for the body displaying portion of the icon corresponding to the stylus.

Display a color selection interface in response to the first preset input.

Herein, the color selection interface is provided with various colors that can be selected by the user as the font color of the stylus.

It should be noted that, a color in the color selection interface may be a preset color or a font color that has been used by the stylus.

Switch the stylus from the first working state to a second working state according to a selection operation of the user on the color selection interface, and update the icon corresponding to the stylus according to the second working state.

In other words, the font color of the stylus is adjusted to a first font color according to the selection operation of the user on the color selection interface. Then, the color of the body displaying portion of the icon corresponding to the stylus (or the color of the power prompt part of the body displaying portion) is updated to the first font color, and the body displaying portion (or the power prompt part) is displayed in the first font color.

Herein, in a case that the user wants to adjust the font size of the stylus, that is, the first working state includes the font size of the stylus, the target displaying portion is the body displaying portion or the tip displaying portion, and the adjustment includes the following steps in which the tip displaying portion is used as an example:

Receive a second preset input for the tip displaying portion of the icon corresponding to the stylus.

Display a font size selection interface in response to the second preset input.

Herein, the font size selection interface is configured to help the user adjust the font size of the stylus.

Herein, the font size selection interface is provided with a plurality of font size options for the user to select. In some embodiments, the font size selection interface is an adjustment bar provided with a slider. The user may slide the slider up and down or left and right along the adjustment bar.

It should be noted that, a font size in the font size selection interface may be a preset size or a font size of that has been used by the stylus.

Switch the stylus from the first working state to a second working state according to a selection operation of the user on the font size selection interface, and update the icon corresponding to the stylus according to the second working state.

In other words, the font size of the stylus is adjusted to a first font size according to the selection operation of the user on the font size selection interface. Then, the size of the tip displaying portion of the icon corresponding to the stylus is updated to the first font size, and the tip displaying portion is displayed in the first font size.

It should be noted that, for steps in which the font size of the stylus is adjusted based on the body displaying portion, reference may be made to the foregoing description in which the tip displaying portion is used as an example. Differences lie in that an input for the body displaying portion is different from the first preset input and that a last step is updating the width of the body displaying portion to the first font size.

In an optional implementation, the first working state includes the font size of the stylus, and the method of the present disclosure may further include the following steps:

Control magnetic force of an electromagnetic element disposed in a stylus groove to be target magnetic force, where the stylus groove is disposed in the electronic device and is used to accommodate the stylus.

The magnetic force of the electromagnetic element is positively correlated with the font size of the stylus.

It should be noted that, a larger font size of the stylus indicates larger magnetic force of the electromagnetic element. In this case, greater resistance is generated when the stylus is pulled out from the stylus groove. Therefore, when a weight change of the stylus is simulated based on the resistance generated when the stylus is pulled out from the stylus groove, the font size of the stylus can be learned based on sense of the user in pulling out the stylus, thereby improving user's experience.

Based on the foregoing limitation to specific components of the icon corresponding to the stylus, to meet user's personalized demand for a state of the stylus and enable the user to adjust the state of the stylus conveniently, in another optional implementation, the first working state includes at least one of the font color or the font size of the stylus, and the method of the present disclosure may further include the following steps:

Receive a first rotation input for a tip of the stylus.

In this step, the tip of the stylus is a nib of the stylus.

Herein, the first rotation input includes: a first target rotation input of rotating around a central axis of a body of the stylus clockwise, or a second target rotation input of rotating around the central axis of the body of the stylus counter-clockwise.

Obtain first rotation data of the tip of the stylus in response to the first rotation input.

It should be noted that, In some embodiments, the electronic device may obtain the first rotation data of the tip of the stylus by using an angle sensor, for example, a Hall sensor.

Herein, the first rotation data includes a rotation direction and a rotation angle of the tip of the stylus.

Switch the stylus from the first working state to a third working state based on the first rotation data, and update the icon corresponding to the stylus according to the third working state.

It should be noted that, in a case that the first working state is the font color of the stylus, the font color is one of the font colors that have been used by the stylus; and in a case that the first working state is the font size of the stylus, the font size is one of the font sizes that have been used by the stylus.

Herein, different rotation inputs for the tip of the stylus are intended to adjust the stylus to different working states, respectively; and the third working state of the stylus after the adjustment may be represented by updating the icon corresponding to the stylus.

For example, in a case that the user wants to adjust the font color of the stylus, that is, the first working state includes the font color of the stylus, the first rotation input is the first target rotation input of rotating around the central axis of the body of the stylus clockwise, and the adjustment includes the following steps:

Receive the first target rotation input for the tip of the stylus.

Obtain first target rotation data of the tip of the stylus in response to the first target rotation input.

Herein, the first target rotation data includes a rotation direction and a rotation angle of the tip.

Switch the stylus from the first working state to a third working state based on the first target rotation data, and update the icon corresponding to the stylus according to the third working state.

In other words, the font color of the stylus is adjusted to a second font color according to the first target rotation data. Then, the color of the body displaying portion of the icon corresponding to the stylus (or the color of the power prompt part of the body displaying portion) is updated to the second font color, and the body displaying portion (or the power prompt part) is displayed in the second font color.

It should be noted that, different rotation angles correspond to different font colors that have been used by the stylus, that is, the second font color is determined based on a rotation angle in the first target rotation data.

For example, in a case that the user wants to adjust the font size of the stylus, that is, the first working state includes the font size of the stylus, the first rotation input is the second target rotation input of rotating around the central axis of the body of the stylus counter-clockwise, and the adjustment includes the following steps:

Receive the second target rotation input for the tip of the stylus.

Obtain second target rotation data of the tip of the stylus in response to the second target rotation input.

Herein, the second target rotation data includes a rotation direction and a rotation angle of the tip.

Switch the stylus from the first working state to a third working state based on the second target rotation data, and update the icon corresponding to the stylus according to the third working state.

In other words, the font size of the stylus is adjusted to a second font size according to the second target rotation data. Then, the size of the tip displaying portion or the width of the body displaying portion of the icon corresponding to the stylus is updated to the second font size.

It should be noted that, different rotation angles correspond to different font sizes that have been used by the stylus, that is, the second font size is determined based on a rotation angle in the second target rotation data.

Generally, a preset region of the body displaying portion may be reserved for displaying the font colors or font sizes that have been used by the stylus. In some embodiments, when the body displaying portion includes the power prompt part, the font colors or font sizes that have been used by the stylus are displayed in a blank region of the body displaying portion. The blank region is used to prompt consumed power.

In some embodiments, when the remaining power of the stylus is represented by the length of the body displaying portion, the font colors or font sizes that have been used by the stylus are displayed in the preset region after the body displaying portion.

Herein, a working state of the stylus is adjusted through a rotation input for the tip of the stylus, which not only increases operation interestingness, but also can improve state adjustment efficiency.

Based on the embodiment shown in FIG. 1, in an optional implementation, the icon corresponding to the stylus is pen-shaped; and the method of the present disclosure may further include the following steps:

Receive a second input for a button that is used for switching an object input type and that is in a text editing interface.

In this step, the second input is a preset input. In some embodiments, the second input may include but is not limited to at least one of a click input, a press input, a long-press input, a pinch input, a drag input, a slide input, or a swipe input. In other words, the second input may be one of the foregoing inputs, or a combination of two or more of the foregoing inputs.

Herein, in some embodiments, the object input type includes at least one of a Chinese input type, an English input type, or a digital input type.

Herein, the button used for switching the object input type includes a Chinese-English input switching button and a digital input switching button.

In response to the second input, adjust a pen-shaped type of the icon corresponding to the stylus to a first pen-shaped type, and display the first pen-shaped type, where the pen-shaped type of the icon corresponding to the stylus corresponds to the object input type in the text editing interface.

In this step, the pen-shaped type of the icon corresponding to the stylus at least includes: a writing brush-shaped type, a crane brush-shaped type, and a fountain pen-shaped type.

In some embodiments, the pen-shaped type that is of the icon corresponding to the stylus and that corresponds to the Chinese input type is the writing brush-shaped type; the pen-shaped type that is of the icon corresponding to the stylus and that corresponds to the English input type is the crane brush-shaped type; and the pen-shaped type that is of the icon corresponding to the stylus and that corresponds to the digital input type is the fountain pen-shaped type.

This implementation can not only increase interestingness of displaying the icon corresponding to the stylus, but also prompt a symbol input type currently used by the user.

Based on the embodiment shown in FIG. 1, in another optional implementation, the icon corresponding to the stylus is pen-shaped; and the method of the present disclosure may further include the following steps:

Receive a second rotation input for the tip of the stylus when the text editing interface is displayed in the touch display screen.

Herein, the second rotation input includes: a third target rotation input of rotating around the central axis of the body of the stylus clockwise, or a fourth target rotation input of rotating around the central axis of the body of the stylus counter-clockwise.

Obtain second rotation data of the tip of the stylus in response to the second rotation input.

It should be noted that, in some embodiments, the electronic device may obtain the second rotation data of the tip of the stylus by using an angle sensor, for example, a Hall sensor.

Herein, the second rotation data includes a rotation direction and a rotation angle of the tip of the stylus.

Based on the second rotation data, adjust the pen-shaped type of the icon corresponding to the stylus to a second pen-shaped type, and display the second pen-shaped type, where the second pen-shaped type is one of pen-shaped types that have been used by the icon corresponding to the stylus, and the pen-shaped type of the icon corresponding to the stylus corresponds to the object input type in the text editing interface.

Herein, different rotation inputs for the tip of the stylus are intended to respectively adjust the icon corresponding to the stylus to different pen-shaped types when the text editing interface is displayed in the touch display screen.

It should be noted that, the object input type in the text editing interface includes at least one of a Chinese input type, an English input type, or a digital input type.

In some embodiments, the pen-shaped type that is of the icon corresponding to the stylus and that corresponds to the Chinese input type in the text editing interface is the writing brush-shaped type; the pen-shaped type that is of the icon corresponding to the stylus and that corresponds to the English input type is the crane brush-shaped type; and the pen-shaped type that is of the icon corresponding to the stylus and that corresponds to the digital input type is the fountain pen-shaped type.

Herein, the pen-shaped type of the icon corresponding to the stylus is adjusted through a rotation input for the tip of the stylus, which not only increases operation interestingness, but also can improve state adjustment efficiency.

In some embodiments, the pen-shaped types that have been used by the icon corresponding to the stylus are displayed in a preset region of the body displaying portion of the icon corresponding to the stylus.

Generally, the preset region of the body displaying portion may be reserved for displaying the pen-shaped types that have been used by the icon corresponding to the stylus. In some embodiments, when the body displaying portion includes the power prompt part, the pen-shaped types that have been used by the icon corresponding to the stylus are displayed in a blank region of the body displaying portion. The blank region is used to prompt consumed power.

In some embodiments, when the remaining power of the stylus is represented by the length of the body displaying portion, the pen-shaped types that have been used by the icon corresponding to the stylus are displayed in a preset region after the body displaying portion.

In still another optional implementation, when the preset region of the body displaying portion is reserved for displaying the pen-shaped types that have been used by the icon corresponding to the stylus, the text editing interface is displayed in the touch display screen; and when a pen-shaped type selection interface allowing the user to select a pen-shaped type for the icon corresponding to the stylus is displayed in response to a third preset input for the body displaying portion being received, a third input on the pen-shaped type selection interface is received.

In response to the third input, adjust the pen-shaped type of the icon corresponding to the stylus to a third pen-shaped type, and display the third pen-shaped type, where the pen-shaped type of the icon corresponding to the stylus corresponds to the object input type in the text editing interface.

Herein, a power state of the electronic device is displayed as a battery-like power icon on a touch display screen. Therefore, to avoid confusion with the icon corresponding to the stylus and facilitate differentiation, an icon that takes the shape of a book and that is in the state bar of the screen is used to indicate power of the electronic device, and reading progress of the book is used to indicate remaining power. For example, if the book is closed, the battery is in a fully charged state. A greater value of the reading progress of the book indicates a smaller amount of the remaining power. If the reading progress is 100%, the remaining power is 0. In this way, related images such as a book and a pen are superimposed, which increases system consistency and improves user's experience.

In addition, note paper is displayed in the state bar of the screen to instruct the user that there is an unread message; and an effect of shredding the note paper instructs the user that the message has been read. Related images such as a book and a pen are superimposed, which increases system consistency and improves user's experience.

According to the icon displaying method in this embodiment of the present disclosure, a first working state of a stylus detachably connected to a device body of an electronic device is obtained; a battery is disposed in the stylus; the first working state includes at least one of remaining power, a font color, or a font size of the stylus; and an icon corresponding to the stylus is displayed based on the first working state. Therefore, the icon that corresponds to the stylus and that can reflect a working state of the stylus is displayed on the electronic device, which can enable a user to learn a state of the stylus in real time and improve user's experience of using the stylus.

Based on the foregoing method, an embodiment of the present disclosure provides an electronic device for implementing the foregoing method.

Figure 3:
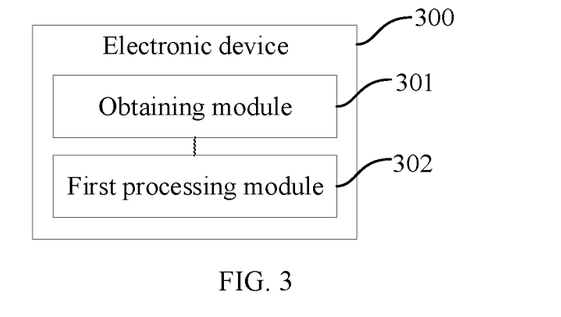
FIG. 3 is a schematic structural diagram of an electronic device according to an embodiment of the present disclosure.

FIG. 3 is a schematic structural diagram of an electronic device according to an embodiment of the present disclosure. An embodiment of the present disclosure provides an electronic device 300. The electronic device includes a device body and a stylus detachably connected to the device body. A battery is disposed in the stylus. The electronic device 300 may further include:

an obtaining module 301, configured to obtain a first working state of the stylus, where the first working state includes at least one of remaining power, a font color, or a font size of the stylus; and a first processing module 302, configured to display an icon corresponding to the stylus based on the first working state.

In some embodiments, the icon corresponding to the stylus includes a tip displaying portion and a body displaying portion connected to the tip displaying portion. A first displaying parameter of the tip displaying portion and/or a second displaying parameter of the body displaying portion are/is used to represent the first working state.

In some embodiments, the electronic device 300 may further include:

a display canceling module, configured to cancel display of the icon corresponding to the stylus when it is monitored that the stylus is detachably connected to the device body.

In some embodiments, the first working state includes at least one of the font color or the font size of the stylus, and the electronic device 300 further includes:

a first receiving module, configured to receive a first input for a target displaying portion of the icon corresponding to the stylus;

a displaying module, configured to display a target selection interface in response to the first input; and a second processing module, configured to: switch the stylus from the first working state to a second working state according to a selection operation of a user on the target selection interface, and update the icon corresponding to the stylus according to the second working state.

In some embodiments, the first working state includes the font size of the stylus, and the electronic device 300 may further include:

a magnetic force controlling module, configured to control magnetic force of an electromagnetic element disposed in a stylus groove to be target magnetic force, where the stylus groove is disposed in the electronic device and is used to accommodate the stylus.

The magnetic force of the electromagnetic element is positively correlated with the font size of the stylus.

In some embodiments, the icon corresponding to the stylus is pen-shaped; and the electronic device 300 further includes:

a second receiving module, configured to receive a second input for a button that is used for switching an object input type and that is in a text editing interface; and a third processing module, configured to: in response to the second input, adjust a pen-shaped type of the icon corresponding to the stylus to a first pen-shaped type, and display the first pen-shaped type, where the pen-shaped type of the icon corresponding to the stylus corresponds to the object input type in the text editing interface.

The electronic device provided in this embodiment of the present disclosure can implement the processes implemented by the electronic device in the method embodiment in FIG. 1. To avoid repetition, details are not described herein again.

According to the electronic device in this embodiment of the present disclosure, an obtaining module obtains a first working state of a stylus detachably connected to a device body of the electronic device; a battery is disposed in the stylus; the first working state includes at least one of remaining power, a font color, or a font size of the stylus; and a first processing module displays an icon corresponding to the stylus based on the first working state. Therefore, the icon that corresponds to the stylus and that can reflect a working state of the stylus is displayed on the electronic device, which can enable a user to learn a state of the stylus in real time and improve user's experience of using the stylus.

Figure 4:
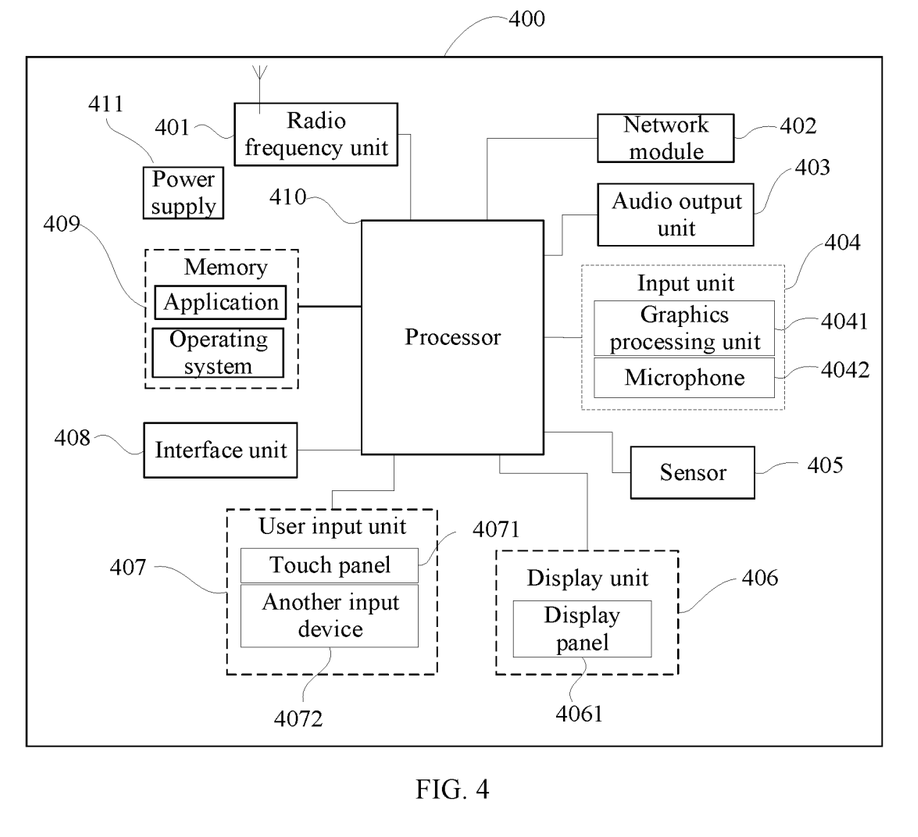
FIG. 4 is a schematic diagram of a hardware structure of an electronic device according to an embodiment of the present disclosure.

FIG. 4 is a schematic structural diagram of hardware of an electronic device according to the embodiments of the present disclosure.

The electronic device 400 includes a device body and a stylus detachably connected to the device body; and a battery is disposed in the stylus. The electronic device 400 further includes but is not limited to: a radio frequency unit 401, a network module 402, an audio output unit 403, an input unit 404, a sensor 405, a display unit 406, a user input unit 407, an interface unit 408, a memory 409, a processor 410, and a power supply 411. A person skilled in the art may understand that a structure of the electronic device shown in FIG. 4 constitutes no limitation on the electronic device, and the electronic device may include more or fewer components than those shown in the figure, or have a combination of some components, or have a different component arrangement. In this embodiment of the present disclosure, the electronic device includes but is not limited to a mobile phone, a tablet computer, a notebook computer, a palmtop computer, an in-vehicle terminal device, a wearable device, and a pedometer.

A first working state of the stylus is obtained, where the first working state includes at least one of the remaining power, a font color, or a font size of the stylus. An icon corresponding to the stylus is displayed based on the first working state.

In this embodiment of the present disclosure, the icon that corresponds to the stylus and that can reflect a working state of the stylus is displayed on the electronic device, which can enable a user to learn a state of the stylus in real time and improve user's experience of using the stylus.

It should be understood that in this embodiment of the present disclosure, the radio frequency unit 401 may be configured to receive and transmit information, or receive and transmit signals during a call. In some embodiments, the radio frequency unit transmits downlink data to the processor 410 for processing after receiving the downlink data from a base station; and transmits uplink data to the base station. Usually, the radio frequency unit 401 includes but is not limited to an antenna, at least one amplifier, a transceiver, a coupler, a low noise amplifier, a duplexer, and the like. In addition, the radio frequency unit 401 may communicate with a network and another device through a wireless communication system.

The electronic device provides users with wireless broadband Internet access through the network module 402, for example, helps users receive and send e-mails, browse web pages, and access streaming media.

The audio output unit 403 may convert audio data received by the radio frequency unit 401 or the network module 402 or stored in the memory 409 into an audio signal and output the audio signal as a sound. In addition, the audio output unit 403 may further provide an audio output (for example, call signal receiving sound or message receiving sound) related to a specific function performed by the electronic device 400. The audio output unit 403 includes a loudspeaker, a buzzer, a telephone receiver, and the like.

The input unit 404 is configured to receive an audio signal or a video signal. The input unit 404 may include a Graphics Processing Unit (GPU) 4041 and a microphone 4042. The graphics processing unit 4041 processes image data of a static image or video obtained by an image capture apparatus (for example, a camera) in a video capture mode or an image capture mode. A processed image frame may be displayed on the display unit 406. The image frame processed by the graphics processing unit 4041 may be stored in the memory 409 (or another storage medium) or sent by using the radio frequency unit 401 or the network module 402. The microphone 4042 may receive sound and can process such sound into audio data. The processed audio data may be converted in a call mode into a format that can be sent by the radio frequency unit 401 to a mobile communication base station for outputting.

The electronic device 400 further includes at least one sensor 405, for example, a light sensor, a motion sensor, and another sensor. In some embodiments, the light sensor includes an ambient light sensor and a proximity sensor. The ambient light sensor may adjust luminance of the display panel 4061 based on brightness of ambient light. The proximity sensor may turn off the display panel 4061 and/or backlight when the electronic device 400 moves close to an ear. As a type of motion sensor, an accelerometer sensor can detect magnitudes of accelerations in all directions (generally, three axes), can detect a magnitude and a direction of gravity when the electronic device is in a static state, and can be applied to posture recognition (such as screen switching between portrait and landscape, related games, and magnetometer posture calibration) of a mobile electronic device, functions related to vibration recognition (such as pedometer and tapping), and the like. The sensor 405 may further include a fingerprint sensor, a pressure sensor, an iris sensor, a molecular sensor, a gyroscope, a barometer, a hygrometer, a thermometer, an infrared sensor, and the like. Details are not described herein.

The display unit 406 is configured to display information input by a user or information provided for a user. The display unit 406 may include a display panel 4061, and the display panel 4061 may be configured in a form of a Liquid Crystal Display (LCD), an Organic Light-Emitting Diode (OLED), or the like.

The user input unit 407 may be configured to: receive input number or character information, and generate a key signal input related to user settings and function control of the mobile electronic device. In some embodiments, the user input unit 407 includes a touch panel 4071 and other input devices 4072. The touch panel 4071 is also referred to as a touchscreen, and may collect a touch operation performed by a user on or near the touch panel 4071 (for example, an operation performed by a user on the touch panel 4071 or near the touch panel 4071 by using any proper object or accessory, for example, a finger or a stylus). The touch panel 4071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, sends the touch point coordinates to the processor 410, and receives and executes a command sent by the processor 410. In addition, the touch panel 4071 may be implemented in various types such as a resistor, a capacitor, an infrared ray, or a surface acoustic wave. The user input unit 407 may include another input device 4072 in addition to the touch panel 4071. In some embodiments, the another input device 4072 may include but is not limited to: a physical keyboard, function keys (for example, a volume control key and an on/off key), a trackball, a mouse, or a joystick. Details are not described herein.

Further, the touch panel 4071 may cover the display panel 4061. When detecting the touch operation on or near the touch panel 4071, the touch panel 4071 transmits the touch operation to the processor 410 to determine a type of a touch event, and then the processor 410 provides a corresponding visual output on the display panel 4061 based on the type of the touch event. Although in FIG. 4, the touch panel 4071 and the display panel 4061 are configured as two independent components to implement input and output functions of the mobile electronic device, in some embodiments, the touch panel 4071 and the display panel 4061 may be integrated to implement the input and output functions of the mobile electronic device. Details are not limited herein.

The interface unit 408 is an interface for connecting an external apparatus with the electronic device 400. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 408 may be configured to receive an input (for example, data information and power) from an external apparatus and transmit the received input to one or more elements in the electronic device 400 or may be configured to transmit data between the electronic device 400 and the external apparatus.

The memory 409 may be configured to store a software program and various data. The memory 409 may mainly include a program storage area and a data storage area. The program storage area may store an operating system, an application required by at least one function (for example, a sound play function or an image display function), and the like. The data storage area may store data (for example, audio data or an address book) or the like created based on use of a mobile phone. In addition, the memory 409 may include a high-speed random access memory or a non-volatile memory, for example, at least one disk storage device, a flash memory, or another volatile solid-state storage device.

The processor 410 is a control center of the mobile electronic device, connects all parts of the entire mobile electronic device by using various interfaces and lines, and performs various functions of the mobile electronic device and data processing by running or executing a software program and/or a module that are/is stored in the memory 409 and by invoking data stored in the memory 409, thereby performing overall monitoring on the mobile electronic device. The processor 410 may include one or more processing units. In some embodiments, the processor 410 may be integrated with an application processor and a modem processor. The application processor mainly processes an operating system, a user interface, an application program, and the like. The modem processor mainly processes wireless communication. It may be understood that the modem processor may not be integrated into the processor 410.

The electronic device 400 may further include the power supply 411 (for example, a battery) supplying power to each component. In some embodiments, the power supply 411 may be logically connected to the processor 410 by using a power management system, so as to implement functions such as charging management, discharging management, and power consumption management by using the power management system.

In addition, the electronic device 400 includes some function modules not shown. Details are not described herein.

An embodiment of the present disclosure further provides an electronic device, including a processor 410, a memory 409, and a computer program stored in the memory 409 and executable by the processor 410. When the processor 410 executes the computer program, the processes of the foregoing embodiments of the icon displaying method are implemented, and a same technical effect can be achieved. To avoid repetition, details are not described herein again.

An embodiment of the present disclosure further provides a computer-readable storage medium. A computer program is stored in the computer-readable storage medium. When the computer program is executed by a processor, the processes of the foregoing embodiments of the icon displaying method are implemented, and a same technical effect can be achieved. To avoid repetition, details are not described herein again. The computer-readable storage medium is, for example, a Read-Only Memory (ROM), a Random Access Memory (RAM), a magnetic disk, or an optical disc.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In the absence of more restrictions, an element defined by the statement "including a . . . " does not preclude the presence of other identical elements in the process, method, article, or apparatus that includes the element.

By means of the foregoing description of the embodiments, a person skilled in the art may clearly understand that the method in the foregoing embodiments may be implemented by software in addition to a necessary universal hardware platform. The method in the foregoing embodiments may also be implemented by hardware. However, in many cases, the former is a preferred embodiment. Based on such an understanding, the technical solutions of the present disclosure essentially or the part contributing to the prior art may be implemented in a form of a software product. The computer software product is stored in a storage medium (for example, a ROM/RAM, a magnetic disk, or an optical disc), and includes several instructions for instructing an electronic device (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skill in the art may make many forms without departing from the objective of the present disclosure and the protection scope of claims, all of which fall within the protection of the present disclosure.

The invention claimed is:

1. An icon displaying method, performed by an electronic device, wherein the electronic device comprises a device body and a stylus, wherein a battery is disposed in the stylus, the icon displaying method comprising:
   obtaining a first working state of the stylus, wherein the first working state comprises at least one of remaining power, a font color, or a font size of the stylus; and
   displaying an icon corresponding to the stylus based on the first working state when it is monitored that the stylus is not disposed in the device body, wherein the icon illustrates the stylus for indicating the first working state of the stylus, wherein the icon comprises a tip displaying portion corresponding to a tip of the stylus, a pen cap displaying portion displayed at a position away from the tip displaying portion by a preset distance, and a body displaying portion connected to the tip displaying portion, the body displaying portion corresponding to a body of the stylus; and
   displaying the pen cap displaying portion covering the tip displaying portion to instruct that the stylus is disposed in the device body.

2. The icon displaying method according to claim 1, wherein a first displaying parameter of the tip displaying portion or a second displaying parameter of the body displaying portion is used to represent the first working state.

3. The icon displaying method according to claim 1, wherein the first working state comprises at least one of the font color or the font size of the stylus, and the method further comprises:
   receiving a first input for a target displaying portion of the icon corresponding to the stylus;
   displaying a target selection interface in response to the first input;
   switching the stylus from the first working state to a second working state according to a selection operation of a user on the target selection interface; and
   updating the icon corresponding to the stylus according to the second working state.

4. The icon displaying method according to claim 1, wherein the first working state comprises the font size of the stylus, and the method further comprises:
   controlling magnetic force of an electromagnetic element disposed in a stylus groove to be target magnetic force, wherein the stylus groove is disposed in the electronic device and is used to accommodate the stylus,
   wherein the magnetic force of the electromagnetic element is positively correlated with the font size of the stylus.

5. The icon displaying method according to claim 1, wherein the icon corresponding to the stylus is pen-shaped, and the method further comprises:
   receiving a second input for a button that is used for switching an object input type and that is in a text editing interface; and
   in response to the second input, adjusting a pen-shaped type of the icon corresponding to the stylus to a first pen-shaped type, and displaying the first pen-shaped type, wherein the pen-shaped type of the icon corresponding to the stylus corresponds to the object input type in the text editing interface.

6. An electronic device, comprising:
   a device body; and
   a stylus, wherein a battery is disposed in the stylus, wherein the electronic device is configured to: obtain a first working state of the stylus, wherein the first working state comprises at least one of remaining power, a font color, or a font size of the stylus; and
   display an icon corresponding to the stylus based on the first working state when it is monitored that the stylus is not disposed in the device body, wherein the icon illustrates the stylus for indicating the first working state of the stylus, wherein the icon comprises a tip displaying portion corresponding to a tip of the stylus, a pen cap displaying portion displayed at a position away from the tip displaying portion by a preset distance, and a body displaying portion connected to the tip displaying portion, the body displaying portion corresponding to a body of the stylus; and
   displaying the pen cap displaying portion covering the tip displaying portion to instruct that the stylus is disposed in the device body.

7. The electronic device according to claim 6, wherein a first displaying parameter of the tip displaying portion or a second displaying parameter of the body displaying portion is used to represent the first working state.

8. The electronic device according to claim 6, wherein the first working state comprises at least one of the font color or the font size of the stylus, and the electronic device is further configured to:
   receive a first input for a target displaying portion of the icon corresponding to the stylus;
   display a target selection interface in response to the first input;
   switch the stylus from the first working state to a second working state according to a selection operation of a user on the target selection interface; and
   update the icon corresponding to the stylus according to the second working state.

9. The electronic device according to claim 6, wherein the first working state comprises the font size of the stylus, and the electronic device is further configured to:
   control magnetic force of an electromagnetic element disposed in a stylus groove to be target magnetic force, wherein the stylus groove is disposed in the electronic device and is used to accommodate the stylus, wherein the magnetic force of the electromagnetic element is positively correlated with the font size of the stylus.

10. The electronic device according to claim 6, wherein the icon corresponding to the stylus is pen-shaped, and the electronic device is further configured to:
receive a second input for a button that is used for switching an object input type and that is in a text editing interface; and
in response to the second input, adjust a pen-shaped type of the icon corresponding to the stylus to a first pen-shaped type, and display the first pen-shaped type, wherein the pen-shaped type of the icon corresponding to the stylus corresponds to the object input type in the text editing interface.

11. A non-transitory computer-readable storage medium, storing a computer program, wherein the computer program, when executed by a processor of an electronic device comprising a device body and a stylus having a battery disposed therein, performs operations comprising:
obtaining a first working state of the stylus, wherein the first working state comprises at least one of remaining power, a font color, or a font size of the stylus; and
displaying an icon corresponding to the stylus based on the first working state when it is monitored that the stylus is not disposed in the device body, wherein the icon illustrates the stylus for indicating the first working state of the stylus, wherein the icon comprises a tip displaying portion corresponding to a tip of the stylus, a pen cap displaying portion displayed at a position away from the tip displaying portion by a preset distance, and a body displaying portion connected to the tip displaying portion, the body displaying portion corresponding to a body of the stylus; and
displaying the pen cap displaying portion covering the tip displaying portion to instruct that the stylus is disposed in the device body.

12. The non-transitory computer-readable storage medium according to claim 11, wherein a first displaying parameter of the tip displaying portion or a second displaying parameter of the body displaying portion is used to represent the first working state.

13. The non-transitory computer-readable storage medium according to claim 11, wherein the first working state comprises at least one of the font color or the font size of the stylus, and the operations further comprise:
receiving a first input for a target displaying portion of the icon corresponding to the stylus;
displaying a target selection interface in response to the first input;
switching the stylus from the first working state to a second working state according to a selection operation of a user on the target selection interface; and
updating the icon corresponding to the stylus according to the second working state.

14. The non-transitory computer-readable storage medium according to claim 11, wherein the first working state comprises the font size of the stylus, and the operations further comprise:
controlling magnetic force of an electromagnetic element disposed in a stylus groove to be target magnetic force, wherein the stylus groove is disposed in the electronic device and is used to accommodate the stylus,
wherein the magnetic force of the electromagnetic element is positively correlated with the font size of the stylus.

15. The non-transitory computer-readable storage medium according to claim 11, wherein the icon corresponding to the stylus is pen-shaped, and the operations further comprise:
receiving a second input for a button that is used for switching an object input type and that is in a text editing interface; and
in response to the second input, adjusting a pen-shaped type of the icon corresponding to the stylus to a first pen-shaped type, and displaying the first pen-shaped type, wherein the pen-shaped type of the icon corresponding to the stylus corresponds to the object input type in the text editing interface.

* * * * *